(12) United States Patent
Cochran et al.

(10) Patent No.: US 6,878,316 B1
(45) Date of Patent: Apr. 12, 2005

(54) METHOD AND APPARATUS FOR HANDLING PARTS EJECTED FROM AN INJECTION MOLDING MACHINE

(75) Inventors: Don W. Cochran, Gates Mills, OH (US); Richard L. Fedor, Mantua, OH (US)

(73) Assignee: Pressco Technology, Inc., Solon, OH (US)

( * ) Notice: Subject to any disclaimer, the term of this patent is extended or adjusted under 35 U.S.C. 154(b) by 0 days.

(21) Appl. No.: 09/958,872

(22) PCT Filed: Apr. 14, 2000

(86) PCT No.: PCT/US00/10252

§ 371 (c)(1),
(2), (4) Date: May 13, 2002

(87) PCT Pub. No.: WO00/61350

PCT Pub. Date: Oct. 19, 2000

Related U.S. Application Data

(60) Provisional application No. 60/129,207, filed on Apr. 14, 1999.

(51) Int. Cl.$^7$ ............................................. B29C 45/76
(52) U.S. Cl. .................. 264/40.1; 264/328.8; 264/334; 425/169; 425/556; 425/588
(58) Field of Search ........................... 264/40.1, 328.8, 264/334, 537; 425/169, 556, 588, 140, 162, 173, 326.1, 215, 522, 534; 198/448

(56) References Cited

U.S. PATENT DOCUMENTS

| | | | | |
|---|---|---|---|---|
| 3,932,042 A | * | 1/1976 | Faani et al. ............... 356/239.4 |
| 4,261,949 A | * | 4/1981 | Spurr et al. .................. 264/535 |
| 4,588,370 A | | 5/1986 | Ichizawa et al. |
| 4,615,719 A | * | 10/1986 | Pauluk et al. ............... 65/29.12 |
| 4,824,349 A | * | 4/1989 | Oku et al. ..................... 425/29 |
| 5,062,053 A | * | 10/1991 | Shirai et al. ................. 700/200 |
| 5,139,406 A | * | 8/1992 | Hoshino et al. ............. 425/140 |
| 5,216,617 A | * | 6/1993 | Kamiguchi et al. ......... 700/201 |
| 5,246,499 A | * | 9/1993 | Peralta et al. ............... 118/641 |
| 5,443,360 A | * | 8/1995 | Lamb et al. ................. 414/799 |
| 5,591,462 A | * | 1/1997 | Darling et al. .............. 425/173 |
| 5,728,409 A | | 3/1998 | Schad et al. |
| 5,772,951 A | * | 6/1998 | Coxhead et al. ............ 264/537 |
| 6,296,473 B1 | * | 10/2001 | Ohlmann ..................... 425/547 |

FOREIGN PATENT DOCUMENTS

| | | |
|---|---|---|
| EP | 0 765 726 A2 | 9/1996 |
| WO | WO 96/05040 | 2/1996 |

OTHER PUBLICATIONS

European Search Reporting corresponding to App. No EP 00 92 3414.

Fuhrmann, G., et al., *Bildverarbeitungssysteme—Einsatz in Der Kunststoffindustrie* Kunststoffberater, Kunststoff Verlag. Isernhagen, De, vol. 41, No. 7/8, Jul. 1, 1996, pp. 8–10.

* cited by examiner

*Primary Examiner*—Michael P. Colaianni
*Assistant Examiner*—Monica A. Fontaine
(74) *Attorney, Agent, or Firm*—Fay, Sharpe, Fagan, Minnich & McKee, LLP

(57) ABSTRACT

This invention relates to a method and apparatus for handling parts ejected from an injection molding machine (10). More particularly, in one aspect, the invention is directed to a system (20) whereby data molded into the ejected part is used to provide useful feedback for the molding process. In another aspect, molded parts formed in a multiple molding die (12) are ejected from the die in a manner to maintain the relative sequential or matrix organization so that useful feedback information can be generated. This system is particularly useful with subsequent machine vision and inspection applications.

18 Claims, 8 Drawing Sheets

METHOD AND APPARATUS FOR HANDLING PARTS EJECTED FROM AN INJECTION MOLDING MACHINE

This application is based on and claims priority to U.S. Provisional Application Ser. No. 60/129,207, filed Apr. 14, 1999, and subsequent PCT Application Serial No. PCT/US00/10252, filed Apr. 14, 2000.

BACKGROUND OF INVENTION

This invention relates to a method and apparatus for handling parts ejected from an injection molding machine. More particularly, in one aspect, the invention is directed to a system whereby data molded into the ejected part is used to provide useful feedback for the molding process. In another aspect, molded parts formed in a multiple molding die are ejected from the die in a manner to maintain the relative sequential or matrix organization so that useful feedback information can be generated. This system is particularly useful with subsequent machine vision and inspection applications wherein, for example, defects in the molded parts can be neurally learned and additional cognitive steps taken to improve the process.

While the invention is particularly directed to the art of injection molding machines, and will thus be described with specific reference thereto, it will be appreciated that the invention may have usefulness in other fields and applications including other molding applications.

By way of background, in the manufacturing process of injection molding, or other types of molding, whereby multiple parts are made per press stroke, or per shot, the parts are typically ejected from the molds such that they fall into a randomly organized jumbled pile. For example, if an injection molding die is making 40 parts per shot than each time the molding die is open, typically those 40 parts would be ejected in mass and would fall onto a conveyor which would bring them out and drop them into the bulk transport containers. This scenario is played out in tens of thousands of injection molding machine operations worldwide and is perfectly satisfactory for many manufacturing situations.

Another unloading scenario that is often used is that of robotic retrieval of components from the tooling. Robots can be used for many reasons some of which are that the components might be too large to drop through and handle properly or they may be damaged by dropping them and bulk conveyor handling. Or that the components need extra cooling time before they are allowed to be in contact with other components to prevent sticking and/or damage to the components. Sometimes robots are used to maintain the correct orientation or ordering of the components, or as a labor reduction technique or as a part of an overall automated system.

More and more attention is being paid within all of manufacturing but certainly within the plastics industries to process control. There are many different methodologies and techniques for monitoring the process in the various types of molding machinery, including injection molding. Monitoring pressure and flow and temperature and viscosity and many other parameters which have a relationship to the quality of the molding process. One of the technologies that is being used increasingly is the technology of machine vision or optical inspection techniques because of the intelligent and comprehensive nature of the kinds of the inspections that can be done.

Machine vision systems are generally comprised of a lighting system to light a specimen and a camera and lens for sensing light reflected therefrom. A processing means is also provided to implement suitable algorithms. A digitized image is formed from an image received by the camera. The data of this image is then available for use in, for example, controlling a robot arm, identifying the specimen, or determining whether the specimen is acceptable to specified standards with respect to, for example, flaws, process variations, or dimensional variations. The data can also be used (as is proposed herein) for feedback and process control. An exemplary machine vision system is shown and described in U.S. Pat. No. 4,882,498 to Cochran et al, which is incorporated herein by reference.

Unfortunately, from a practical standpoint, it is not presently possible to do a vision inspection while the product is being molded because of the high temperature, high pressure environment inside a tool cavity. Therefore, vision inspection is typically done after the injection molding die as an example would open thus, exposing the part. Unfortunately, because the injection molded part may still be engaged with a portion of the tooling when the dies are separated, there is only a limited amount of inspection that can be easily done at the point of die separation. Often, even if the desired features can be observed when the dies are parted but before the components are ejected from the tooling, it is a difficult machine vision inspection task for a variety of reasons.

The manufacturer does not want to slow down the manufacturing process by leaving the die in a fixed open position. Since there are multiple die cavities and therefore, multiple components to be inspected with each shot, it is necessary to either have many cameras, each focused at its own respective component, or group of subcomponents, or the resolution is poor because with a more limited number of cameras, the respective number of pixels falling on any given component is reduced, there are angle of view problems and challenges, there are space and mounting constraints, and optimum illumination is extremely difficult. While there are certainly some attributes that can be inspected optically or by machine vision, while the part is still in the separated tool, it can be easily understood that it is very limited and a comprehensive inspection can not usually be undertaken. It is therefore much more desirable in order to do a comprehensive inspection to do that inspection after the parts have been ejected from the molding die. It is well known in the molding industry, especially in injection molding, that there are many different kinds of defects that are produced during the injection molding process. The Society of Manufacturing Engineers has a CD-ROM training program that they have been advertising which is entitled "Trouble Shooting Injection Molding Problems". It lists the following 24 different defects which it teaches how to trouble shoot. The defects listed are: black specs, blisters, blush, bowing, brittleness, bubble/voids, burn marks, clear spots, cloudy appearance, contamination, cracking, crazing, delamination, discoloration, flash, flow lines, low gloss, jetting, knit lines, non-fill/short shot, excessive shrinkage, sink marks, splay and warpage.

Additionally, there is a wide variety of dimensional defects that can occur in injection molded parts. It is very desirable to do machine vision or optical inspection to look for some or all of the above defects and reject the faulty parts. Just providing that function is often thoroughly economically justifiable so that quality can be monitored by way of sorting out bad product. But to make an inspection system even more valuable to an injection molding manufacturer, it is desirable to be able to provide statistical process control information so that the process can be corrected such that it does not manufacture the faulty parts.

Sometimes the machine vision inspection information alone is not enough to make the call on what is going out of control in the process and may need to be combined with other sensory information. Regardless of whether only the machine vision or optical inspection data is used to make the determination of process variation or whether it is combined with other sensory information from the process, it must be correlated back to which molding cavity or cavities is responsible for producing the bad component(s).

If the molded parts are simply ejected such that they fall in a non-organized group onto a shoot or conveyor, then relevant process control information pointing to which mold cavity the molded component came from is lost.

The present invention contemplates a new approach to handling parts ejected from injection molding machines which resolves the above-referenced difficulties and others.

SUMMARY OF THE INVENTION

This invention relates to a method and apparatus for handling parts ejected from an injection molding machine. More particularly, in one aspect, the invention is directed to a system whereby data molded into the ejected part is used to provide useful feedback for the molding process. In another aspect, molded parts formed in a multiple molding die are ejected from the die in a manner to maintain the relative sequential or matrix organization so that useful feedback information can be generated. This system is particularly useful with subsequent machine vision and inspection applications.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the system and the steps of the method whereby the objects contemplated are attained as hereinafter more fully set forth and the accompanying drawings in which.

DETAILED DESCRIPTION OF THE PREFERRED EMBODIMENTS

Figure 1:
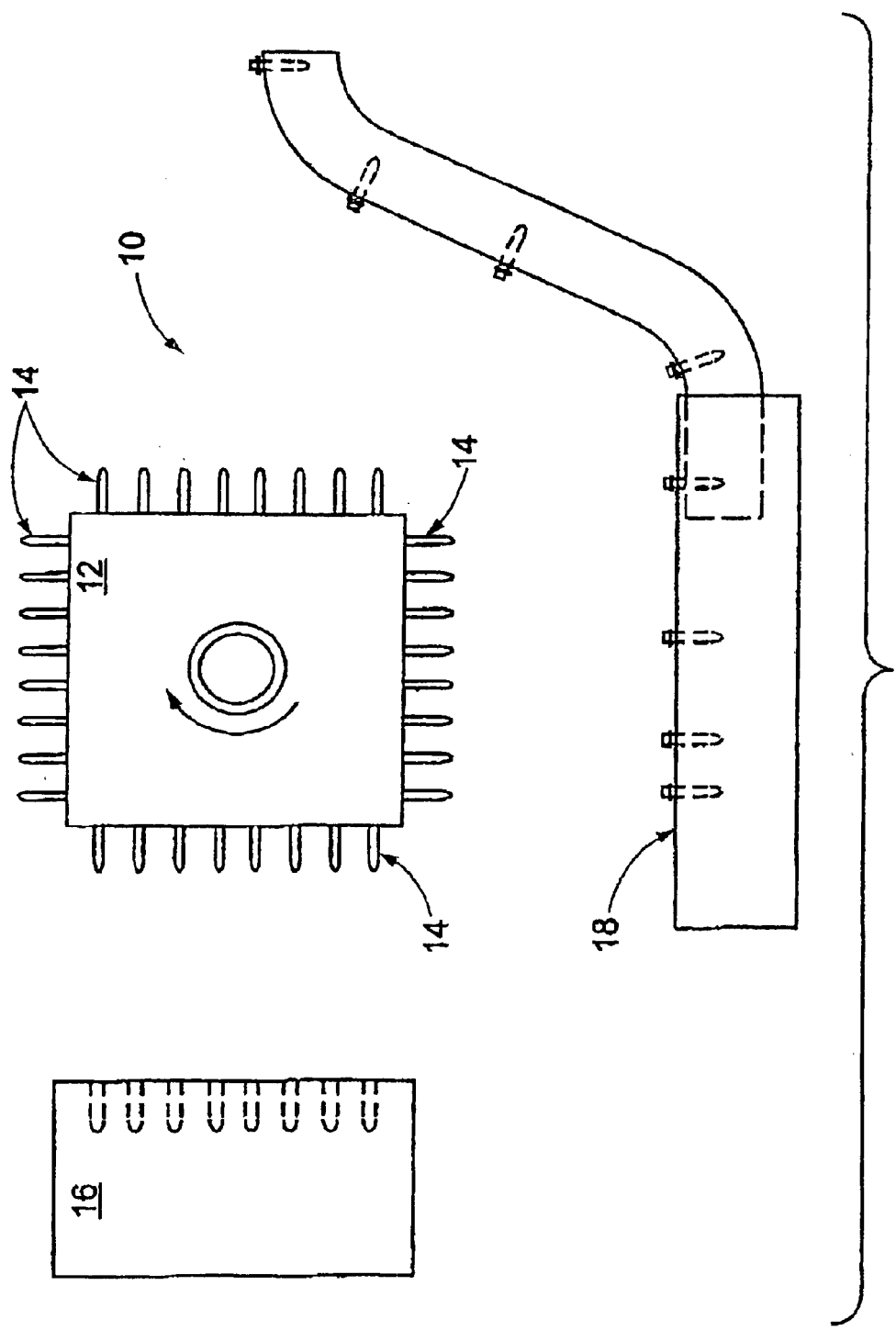
FIG. 1 shows a molding system to which the present invention may be applied.

The present invention may take a variety of forms. Primarily, the invention is directed to handling parts ejected from an injection molding machine. As noted above, this is particularly useful for subsequent machine vision or optical inspection applications which are used to provide useful feedback to the molding system to improve the process. For example, the feedback may result in shutting off a cavity or changing the temperature or pressure of the cavity to improve the process.

One way to implement the invention is to take advantage of the fact that data is typically molded into most molded parts to indicate such things as mold number, cavity number, plant number, plant location, company, etc. Using known techniques that have heretofore not been used in the injection molding environment, it is possible to reorient the molded parts and then read (through, for example, electro-optical character recognition) this molded-in data so that this information can be retrieved. This, generally, is a complicated task with many molded components because they are either difficult to orient or it is difficult to read the very small low-contrast molded-in codes. It is, however, a viable way of determining from which injection mold cavity the part being inspected may have come and therefore the process control information can be related back to the particular cavity or cavities that are sourcing the problem. In this regard, as an option, special easily readable code could be formed into the molded part to facilitate ease of reading. This provides a significant improvement over the current state-of-the-art in that it allows true closing of the process control loop by way of the vision and other sensor examination so that control adjustments can be made accordingly in the injection molding machine.

An alternative and preferred way to derive useful mold cavity information works from the concept of capturing and then organizing in a known sequence the molded parts as they are ejected from the mold die. This is preferably accomplished in the present invention in the following way.

At the moment when the molded parts coming from a multiple molding die are ejected from the die, the parts are dropped into pockets or tubes which maintain their relative sequential or matrix organization. The tubes then transport the molded parts into a known sequence or known sequences.

In one embodiment of the invention, the bullet parts would be transposed from a matrix of x by y into a single known sequenced row of xy by 1. For example, if the mold comprised a six cavity by 8 cavity matrix equaling 48 molded parts which are made with each shot, then the tubes could transport them into a 48×1 known order row of components.

The tubes or tracks could maintain certain aspects of orientation such that the molded components can be dropped into or onto a conveyance means in an at least partially oriented way. For example, the body of a ball-point pen or of a felt tip marker, could be held in an upright orientation such that the open end, or the larger open end, would be maintained in a particular orientation. In the case of injection molded preforms, which are the first step in the stretch blow formed PET bottle manufacturing process, these could exit the tubes, or guide rails, such that the open end is up. Similarly, molded prescription bottles could be maintained in a open end up or open end down configuration such that inspection and process monitoring by way of the inspection is facilitated. Since many parts fall into the category of being circularly symmetrical or cylindrical, this maintenance of partial orientation is a valuable feature for the further automation of the process monitoring sequence. There are many other classes of products which have significant ratios between their height and length, and it would be desirable to maintain at least partial orientation on these products to facilitate the process monitoring as well. There are still other classes of products which are very challenging to orient because multiple axes are symmetrical about their center lines or have no mechanically distinguishing features. For such types of products, it is a major advantage to be able to maintain their orientation to be able to do process monitoring and further subsequent automation. To the extent that many manufacturers are trying to achieve what is known as a lights-out factory, it is desirable to maintain the orientation of the product as early in the automated process as possible and maintain it throughout.

It is also important to understand that while a tube is a very useful transport device for purposes of this invention, other geometrical shapes or configurations such as track work, or guiding cages, or other could easily be substituted for tubes. Tubing has the advantage of being readily available, relatively inexpensive, can be either rigid or flexible, and does not require excessive customizing. Sometimes, it can be desirable to move the matrix plate wherein the tubes are housed closer to the tool at the moment of ejection so that they will not become misoriented in the process of being ejected. When this is done it is even more important to have flexibility in the tubing, or tubing equivalent, that is used to guide the products to a more sequential orientation. If rigid tubing is used, therefore, it should preferably be a telescoping type of tube so that movement toward and away from the molding device can be accommodated.

It should be understood that under some circumstances it is desirable to not guide the products into a single row of product, but rather into multiple rows of product such that they can be inspected perhaps at more than one location or to be able to obtain enough processing speed or to facilitate more convenient material handling situations or to ultimately guide them back into a single row by virtue of subsequent material handling.

Once the products are in the known sequence, they can be indexed out from the landing position by a conveyance means and can then subsequently be taken through a vision or other type of real-time inspection system that functions to inspect each molded part. These systems are well known in the art. The inspection system would normally be comprised of a sensor to indicate that a molded part has arrived at each inspection station and then from one to many inspection heads which could either be co-located or located sequentially down a conveyance means.

The invention is particularly applicable to the injection molding of preforms as mentioned earlier for the stretch blow-forming bottle production market. By way of maintaining the appropriate orientation for the preforms, they can be inspected for many attributes which by knowing which injection molding tooling station they originated from will yield much valuable process control data. Most desirously, the top seal surface could be inspected looking for nicks and flash and wavy surface dimensions and out-of-roundness condition. The centrality of the gate could also be checked. Another video inspection technique could be used to determine the straightness of the preform.

There is a variety of defects that occur in the side walls which include but are not limited to the following list: bubbles, inclusions, black specks, flow lines, crystallization, partial crystallization, tip crystallization, side wall thickness, out of tolerance or thickness having too great a variation from one area to another, cloudiness, gate nub too long, diameters of threads, diameters of the base of threads, diameter of the pilfer-proof ring, gate pin holes, surface dings or blemishes, burn marks and so on.

If defects are deemed to be fatal, the system would then reject the bad component through a special ejection gate. If, however, the defect was determined not to be a fatal flaw but rather just process information that should be corrected, then it would be used accordingly as is known in the art. Also, with this sequencing arrangement, the injection molding cavity can be correlated so that, for example, the third preform in a sequenced group of preforms would be known to be coming from injection mold cavity number three. To the extent that there are multiple dies, it would be known from which die it came by way of a signal indicating which mold was ejected for that set of inspections.

Yet another aspect of the invention allows for the fact that if a certain mold cavity or cavities where consistently producing product that was at an unacceptable level of quality, then that station or stations could be turned off while production continues. The information indicating which stations have not produced a molded part for that particular shot would be communicated to the inspection system so that the products could be properly correlated by their sequencing. In other words, if station number three in the injection molding die has been turned off, then the sequence would be one, two, four, five, six, etc. through the entire sequence and the statistics and process control information should be handled accordingly in the automated inspection system.

Another embodiment of the invention uses sensors to potentially both make sure that the molded parts have dropped into the tubes and cleared the die and yet another set of sensors that insure that they have left the tubes and have dropped into the conveyance means.

Yet another embodiment of the invention relies upon gravity to move the molded parts through the transport tubes from the matrix plate down to the linear exit plate while, in another embodiment of the invention, air-jets are provided to assist in the movement of the molded parts through the tubes. This is particularly applicable if the products have to transfer some significant horizontal distance relative to the vertical or gravity distance.

Yet another embodiment of the invention provides for using tubes which have a reduced coefficient of friction on their interior surfaces. Yet another embodiment of the invention uses transport tubes that have an interior surface that is a polymer or an elastic material that has a durometer which is greater than 50 on the shore A scale. Yet another embodiment calls for the application of a friction reducing substance on the inside of the tubes such as Teflon or other fluorocarbon materials. Yet another embodiment of the invention uses spirally wound hosing material to provide for additional flexibility.

Yet another embodiment of the invention articulates the matrix plate toward and away from the injection molding die that will be ejecting the parts so that the distance is close enough that they can not lose proper orientation nor miss the tubes. This could take a number of different forms including the matrix plate moving in and out of the unloading position in a robotic like way, it could move simply toward and away from in a vertical manner on appropriate guide rods, or it could swing on an arc such that it was retraced from the tooling so that it did not interfere with machine function in normal process. Yet another embodiment of the invention provides for the moving of the matrix plate which is holding the entrance end of the tubes to accommodate the extra space required if the die is one of a rotary nature but such that it could still be serviced properly by the system.

Yet another embodiment of the invention provides for a series of sensors or a single through-beam sensor which would verify that all of the molded components have left the landing area and had been transported by way of the conveyance means, out of the landing area such that they will not interfere with the landing of the next group that falls as a safety measure. Yet another embodiment of the invention involves using a tapered piloting method for dropping in the case that the system is used for preforms for dropping the preforms closed end first down into a conveyance means such that they will hang on the neck ring and the space between the conveyance means will be greater than the diameter of the preform such that it can fall freely down between the two sides of the conveyance means.

Referring now to the drawings wherein the showings are for purposes of illustrating the preferred embodiments of the invention described above and hereafter, and not for purposes limiting same, FIG. 1 provides a representative view of an injection molding system to which the present invention may be applied. As shown, injection molding system 10 comprises a turret block 12 which is operative to release molded parts from mold cores 14 which cooperate with the device 16 to form the molded parts. This type of injection molding system is described in U.S. Pat. No. 5,772,951 to Coxhead et al. and U.S. Pat. No. 5,728,409 to Schad et al., both of which are incorporated herein by reference.

In one embodiment of the invention noted above, the molded parts, once formed, are ejected from the turret 12 to a conveyor device 18, which may take a variety of suitable forms. The parts are then conveyed to an inspection station (shown, for example, in FIG. 2) wherein the parts are inspected and data or codes formed into the parts by the molding process are read to determine the mold cavity of origin for purposes of identifying cavities that require attention to improve the process. Whether the parts are inspected first or read first will depend on the needs of the user and the inspection system used. The data obtained by the inspection system is suitably processed using known techniques to provide useful feedback to the molding system to improve the process. Examples of such feedback control are outlined above.

Figure 2:
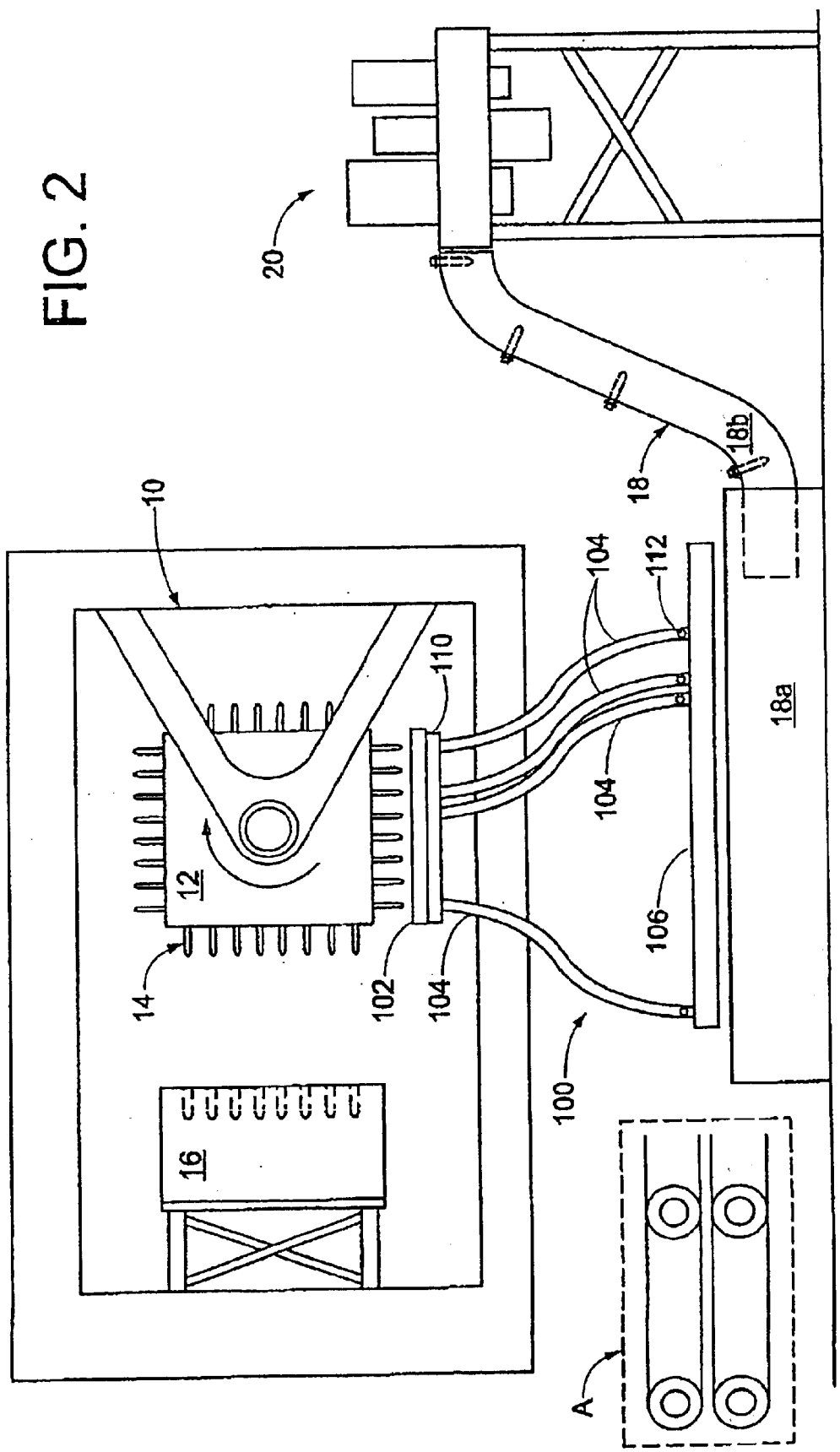
FIG. 2 shows an embodiment according to the present invention.

Referring now to FIG. 2, an embodiment incorporating the aspects of the alternative preferred embodiment described above is shown. More specifically, injection molding system 10, generally described above, is shown. Also shown is a station 20 positioned at the opposite end of the conveyor device 18 to accommodate vision and other inspection techniques. Devices (representatively shown as boxes on the station 20) which accomplish such functions are well known in the art and include suitable image acquisition and data processing devices as well as feedback and process control functions.

Significantly, FIG. 2 shows a device 100 for facilitating orderly part ejection from an injection molding device 10. As described above, the device 100 comprises a matrix plate 102 having therein a plurality of apertures which correspond to the number of mold cores 14 of the turret 12. The apertures have tubes 104 (not all shown) extending from the side opposite the turret 12. Tubes 104 extend from the matrix plate 102 to a linear pocket plate 106. It is to be appreciated that molded parts are ejected from the turret 12 through the apertures of the matrix plate 102 and down corresponding tubes 104. The molded parts then exit the tubes 104 through corresponding apertures in pocket plate 106 to be dropped onto the conveyor device 18 and transported to station 20 for vision and other inspection techniques.

Also shown in FIG. 2 are optional items such as an air jet assist device 110 to facilitate transport of the molded parts through the tubes. In addition, sensors 112 are also exemplary shown. The air jet assist device and sensors are described above. FIG. 2 also shows a top view A of the straight conveyor 18a with example conveyor belts illustrated.

Figure 3:
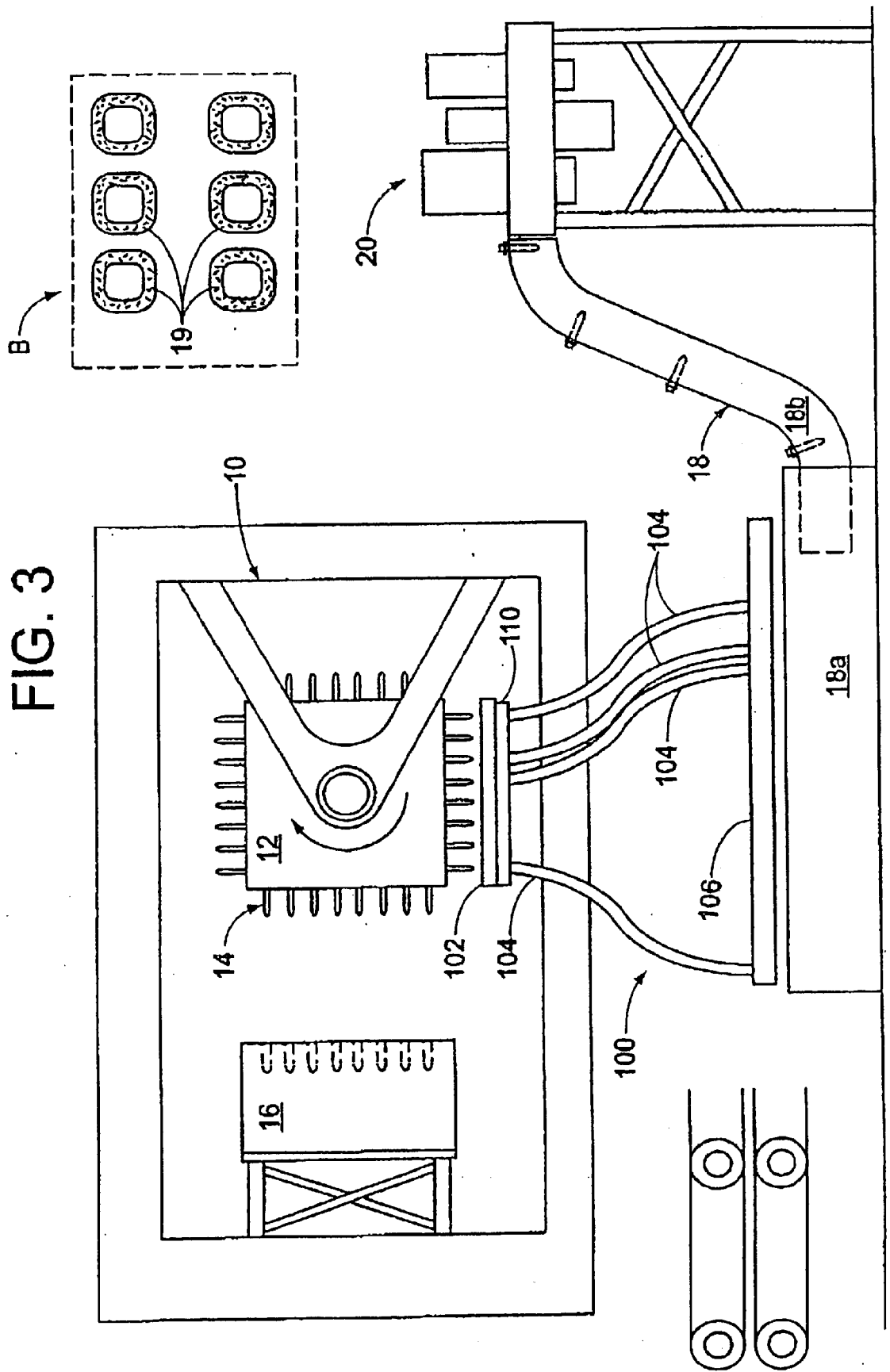
FIG. 3 shows a further embodiment according to the present invention.

FIG. 3 shows a system similar to that shown in FIG. 2. However, the turret 12 of FIG. 3 is shown to rotate in a counter clockwise direction as opposed to a clockwise direction. Further, no sensors 112 are shown in FIG. 3. In addition, a top view B of a portion of the S-shaped conveyor 18b is shown respectively as having flexible, sponge-like members 19 for gripping parts for transport to the inspection station.

Figure 4:
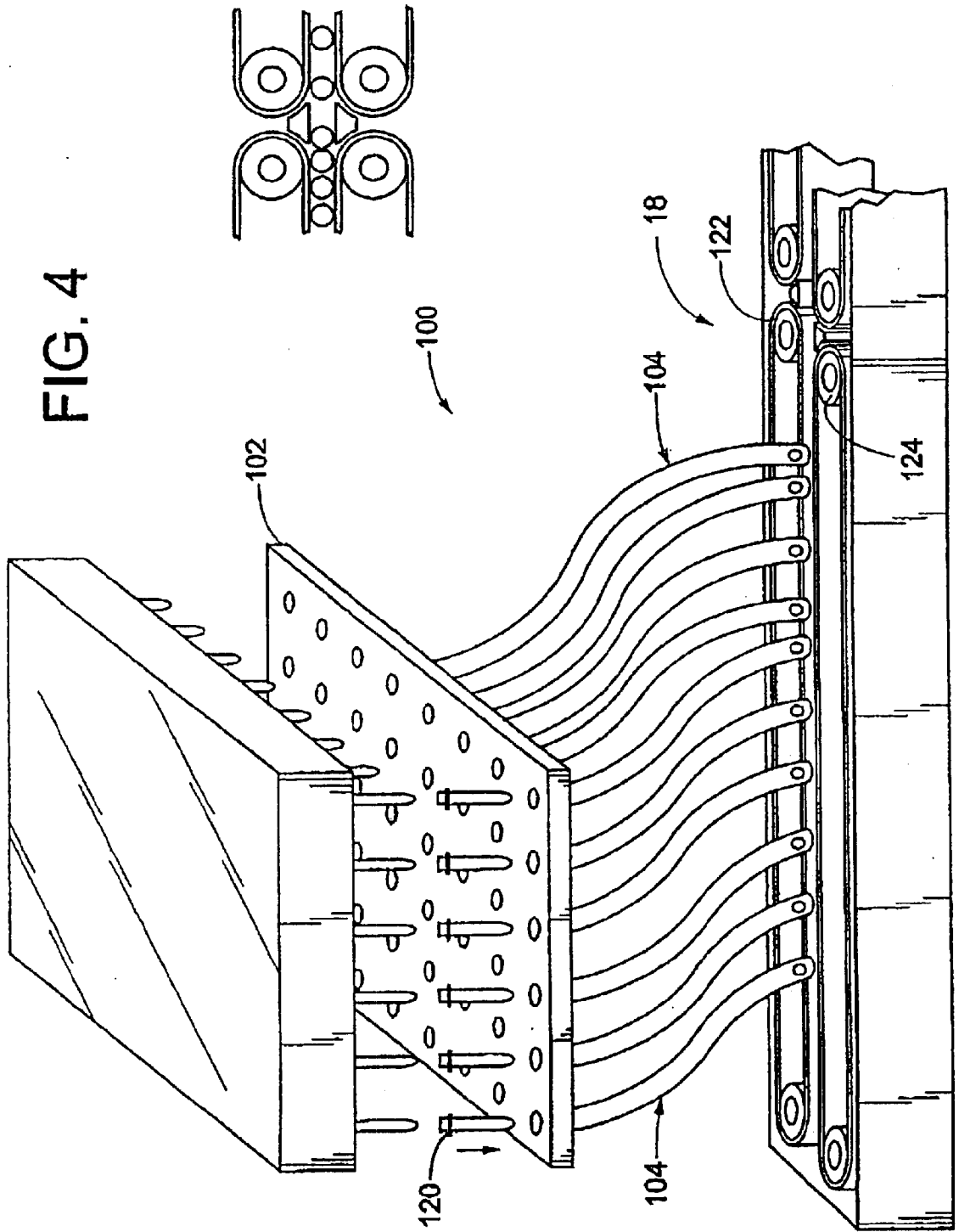
FIG. 4 shows a more detailed embodiment according to the present invention.

Referring now to FIG. 4, a more detailed representation of device 100 is shown. Specifically, the matrix plate 102 is shown to have 48 apertures therein formed in a 6-by-8 matrix configuration. Tubes extending from each of the apertures is shown to extend to the plate 106 (not specifically shown here for simplicity) to transform the 6-by-8 matrix into a 48-by-1 linear configuration. Molded parts, exemplary shown at 120, are also shown in FIG. 4.

Figure 5:
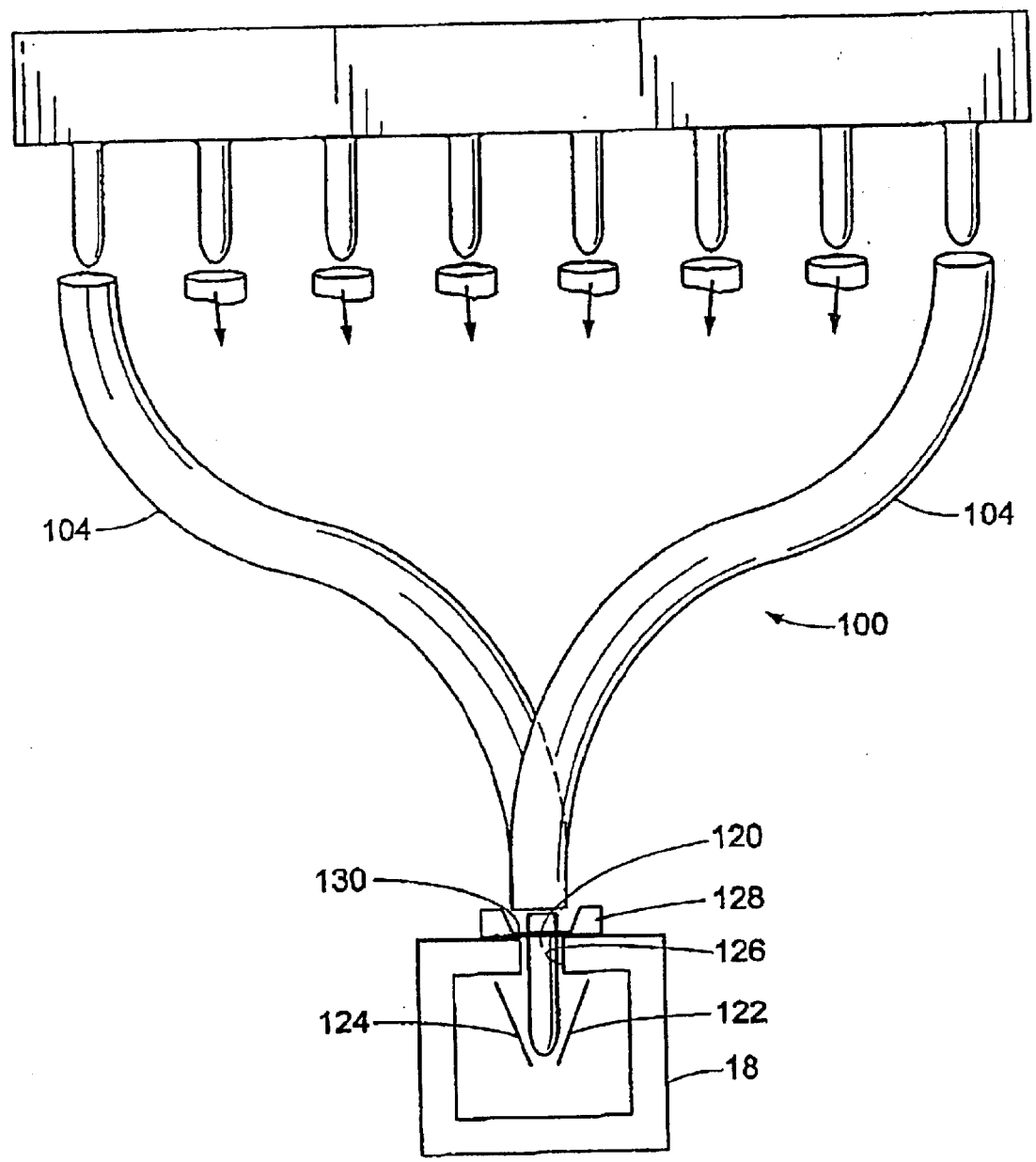
FIG. 5 shows a cross-sectional end view according to the present invention.

Further, FIG. 4 shows a portion of the conveyor device 18 comprising conveyor belts 122 and 124. As shown more particularly in FIG. 5, which is a cross-sectional end view of the device 100 and the conveyor 18, the conveyor belts 122 and 124 may be oriented to provide a V-shape to accommodate the molded part. The device 18 also includes a slot 126 and shoulder 128 that accommodate the neck portion 130 of the exemplary molded part 120 shown.

Figure 6:
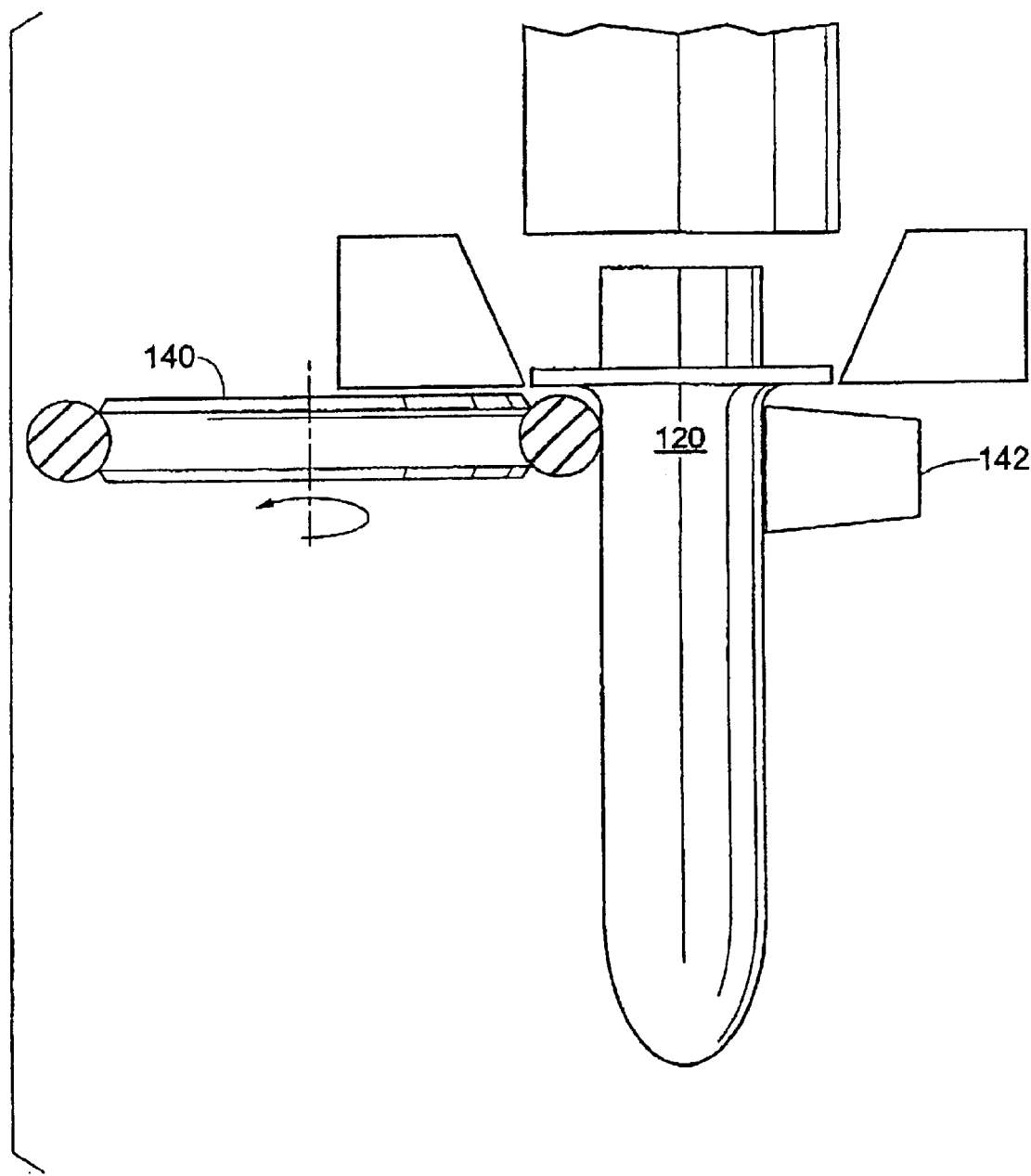
FIG. 6 shows a cross-sectional view of another embodiment according to the present invention.

FIG. 6 represents alternatives that may be used as a conveyor device 18. Specifically, rounded belt 140 is shown to accommodate transport of the molded object 120. It is to be appreciated that another rounded belt could be positioned on an opposite side of the conveying device 18 or a belt of a different cross-section could be used. As shown in FIG. 6, a belt 142 having a trapezoid cross-section is shown. It is to be appreciated that the conveyor belts used in connection with the present invention can be of any form to suit the shape of the molded part being handled. Those described herein are merely examples.

Figure 7:
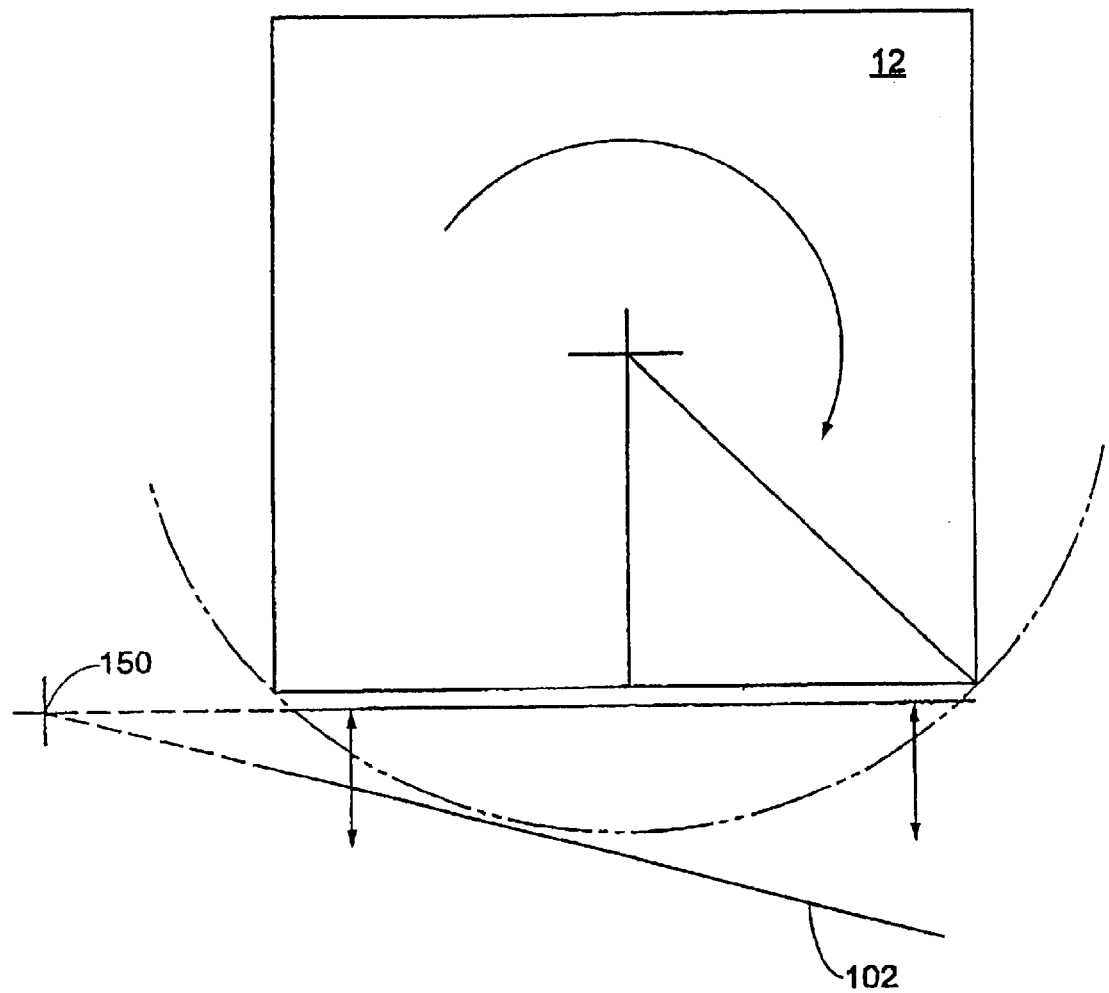
FIG. 7 shows a still her embodiment according to the present invention.

FIG. 7 shows that the matrix plate 102 may be required to be moved out of the rotating area of the turret 12 by use of a hinge point 150 on one side of the plate 102. Any known techniques can be used to effect the hinge point and the matrix plate may be articulated by known techniques such as an air cylinder, hydraulic cylinder, cam, etc.

It should be appreciated that the tubes 104 may have critical angles to meet in order for convenient transport of the molded parts therethrough. In the event that a particular angle of a tube does not accommodate ease of transport therethrough, a number of techniques can be used, as described above. For example, the inside of the tubes can be coated with low friction resistance material such a Teflon and/or air assist jets could be used to blow the molded part through the tube.

Figure 8:
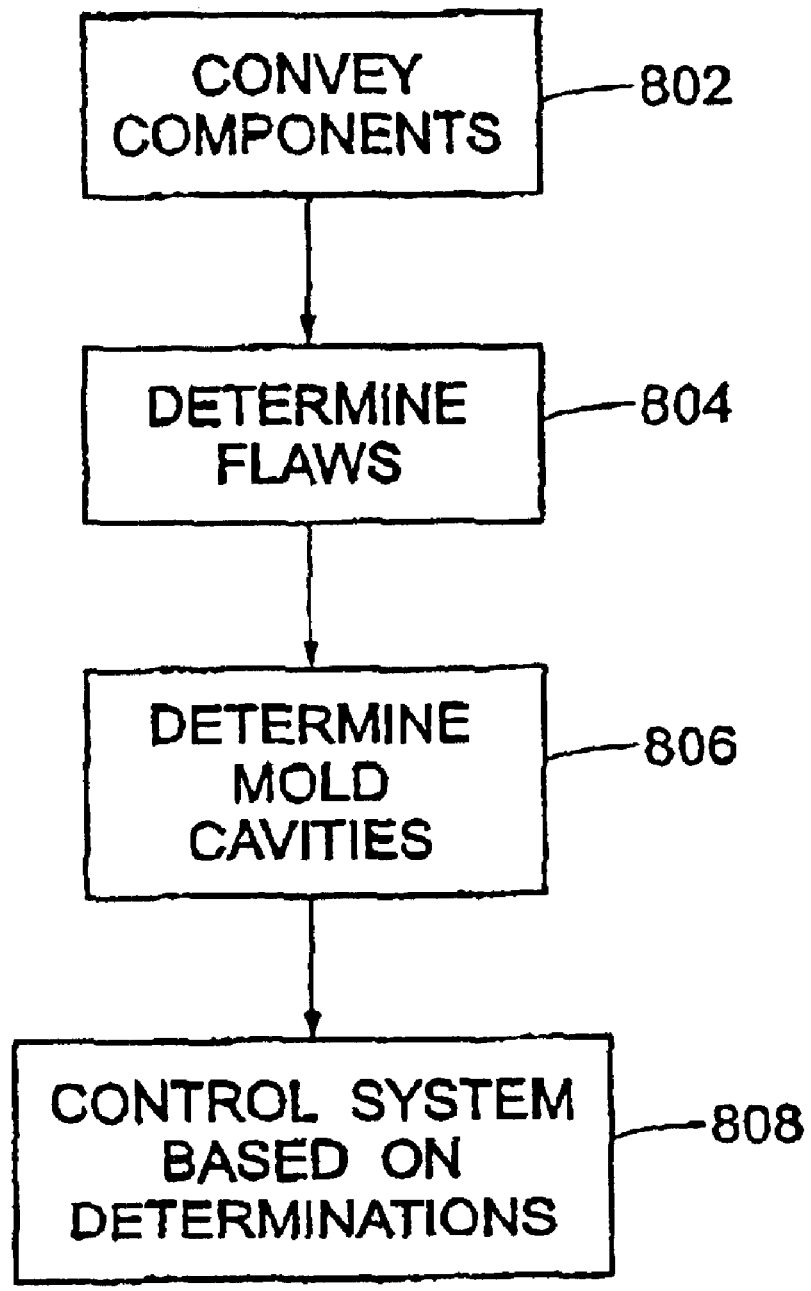
FIG. 8 is a flow chart.

To further emphasize, the operation of the system as described in detail above, FIG. 8 provides a flow chart illustrating overall operation of the system. It should be appreciated that this method of the invention should be apparent from the detailed description described above. First, components ejected from the injection molding and inspection system of the present invention are conveyed from the die to the inspection unit (step 802). Next, a determination is made if flaws are present in any of the components by the inspection unit (step 804). Next, a determination is made as to which mold cavity (or cavities) that an inspected component(s) was ejected by maintaining the components in a selected order as outlined above, or recognizing information molded into the component as also outlined above (step 806). Last, the injection molding and inspection system is controlled according to the information gained as outlined above (step 808). It should be appreciated and should be clear from the above description that the above method can be implemented in the system described herein using suitable hardware and software techniques that should be apparent upon a reading of this specification.

The above description merely provides a disclosure of particular embodiments of the invention and is not intended for limiting the same thereto. As such, the invention is not limited to only the above-described embodiments. Rather, it is recognized that one skilled in the art could conceive alternative embodiments that fall within the scope of the invention.

What is claimed is:

1. A method for process control in an injection molding and inspection system, the injection molding and inspection system being operative to mold components using a die having mold cavities and inspect the components using an inspection unit, the method comprising steps of:

conveying the components ejected from the die to the inspection unit;

determining if flaws are present in any of the components;

determining from which mold cavity an inspected component has been ejected by maintaining the components in a selected order from ejection to inspection by transforming an x by y matrix of the components ejected from the die into an (x times y) by 1 matrix of components; and, selectively controlling the injection molding and inspection system based on the determining steps.

2. The method as set forth in claim 1 wherein the transforming comprises transporting the components through tubes.

3. The method as set forth in claim 1 wherein the selectively controlling comprises shutting down at least one mold cavity.

4. The method as set forth in claim 1 wherein the selectively controlling comprises correlating the flaws determined with a mold cavity.

5. A system for process control, the system being associated with devices operative to mold components using a die having mold cavities, the system comprising:

means for conveying the components ejected from the die to an inspection unit;

electro-optical means for determining if flaws are present in any of the components;

means for determining from which mold cavity an inspected component has been ejected by maintaining the components in a selected order from ejection to inspection using tubes, a matrix plate having apertures connected to first ends of the tubes, and a linear pocket plate connected to a second ends of the tubes; and, means for selectively controlling the injection molding and inspection system based on the determining steps.

6. The system as set forth in claim 5 wherein the tubes have a reduced friction surface to facilitate transport of the components therethrough.

7. The system as set forth in claim 5 further comprising a jet assist device to facilitate transport of the components through the tubes.

8. The system as set forth in claim 5 further comprising sensors operative to detect at least one of whether the components have cleared the mold cavities and whether the components have been transported through the tubes.

9. The system as set forth in claim 5 wherein the die includes mold cavities arranged to produce an x by y matrix of the components and the means for determining from which mold cavity an inspected component has been ejected by maintaining components in a selected order comprises a means for transforming the x by y matrix into an (x times y) by 1 matrix of components.

10. The system as set forth in claim 9 wherein the means for transforming comprises the tubes.

11. The system as set forth in claim 9 wherein the means for transforming comprises an x by y matrix plate connected to the first ends of the tubes.

12. The system as set forth in claim 9 wherein the means for transforming comprises an (x times y) by 1 linear pocket plate connected to the second ends of the tubes.

13. The system as set forth in claim 5 wherein the components comprise preforms.

14. A system for process control, the system being associated with devices operative to mold components using a die having mold cavities, the system comprising:

a plurality of tubes through which the components ejected from the die are transported;

a matrix plate with apertures corresponding to the mold cavities and having first ends of the tubes disposed therein to receive the ejected components, the matrix plate apertures forming an x by y matrix;

a linear pocket plate with apertures having second ends of the tubes disposed therein through which the ejected components exit the tubes, the linear pocket plate apertures forming an (x times y) by 1 matrix;

a conveyance device operative to convey the components to an inspection unit after exiting the tubes;

the inspection unit operative to detect flaws in the components; and, means for selectively controlling the system based on detection of flaws in the components and correspondence of flawed components to mold cavities.

15. The system as set forth in claim 14 wherein the tubes have a reduced friction surface to facilitate transport of the components therethrough.

16. The system as set forth in claim 14 further comprising a jet assist device to facilitate transport of the components through the tubes.

17. The system as set forth in claim 14 further comprising sensors operative to detect at least one of whether the components have cleared the mold cavities and whether the components have been transported through the tubes.

18. The system as set forth in claim 14 wherein the components comprise preforms.

* * * * *